(12) United States Patent
Vojtisek et al.

(10) Patent No.: US 10,029,621 B2
(45) Date of Patent: Jul. 24, 2018

(54) REAR VIEW CAMERA SYSTEM USING REAR VIEW MIRROR LOCATION

(71) Applicant: FORD GLOBAL TECHNOLOGIES, LLC, Dearborn, MI (US)

(72) Inventors: Mark G. Vojtisek, Royal Oak, MI (US); Michael J. Miller, Commerce Township, MI (US); Carla A. Gale, Northville, MI (US); Richard A. Kreder, Northville, MI (US); Mary C. Spieth, Ann Arbor, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 951 days.

(21) Appl. No.: 13/895,646

(22) Filed: May 16, 2013

(65) Prior Publication Data
US 2014/0340516 A1  Nov. 20, 2014

(51) Int. Cl.
*B60R 11/04* (2006.01)
*B60R 1/00* (2006.01)

(52) U.S. Cl.
CPC ............ *B60R 11/04* (2013.01); *B60R 1/00* (2013.01); *B60R 2300/303* (2013.01)

(58) Field of Classification Search
CPC ........................................................ B60R 1/00
See application file for complete search history.

(56) References Cited

U.S. PATENT DOCUMENTS

| | | | |
|---|---|---|---|
| 5,289,321 A | 2/1994 | Secor | |
| 6,708,099 B2 | 3/2004 | Tellis et al. | |
| 7,161,616 B1 | 1/2007 | Okamoto et al. | |
| 7,643,911 B2 | 1/2010 | Ishihara et al. | |
| 8,379,844 B2 | 2/2013 | Ebeid | |
| 8,866,906 B1* | 10/2014 | Abad | B60R 1/00 348/143 |
| 2002/0003571 A1* | 1/2002 | Schofield | B60C 23/00 348/148 |
| 2003/0090568 A1 | 5/2003 | Pico | |
| 2005/0002545 A1 | 1/2005 | Yasui et al. | |
| 2005/0040939 A1* | 2/2005 | Jobes | B60Q 1/22 340/438 |
| 2005/0146607 A1 | 7/2005 | Linn et al. | |
| 2009/0225434 A1* | 9/2009 | Nicholas | B60R 1/00 359/630 |

(Continued)

OTHER PUBLICATIONS

Zhijun Wang et al., A Comparative Analysis of Image Fusion Methods, IEEE Transactions on Geoscience and Remote Sensing, vol. 43, No. 6, Jun. 2005.

*Primary Examiner* — Dave Czekaj
*Assistant Examiner* — Berteau Joisil
(74) *Attorney, Agent, or Firm* — Vichit Chea

(57) ABSTRACT

A rearward viewing system for an automotive vehicle comprises an image display mounted proximate to a front windshield of the vehicle. An exterior image sensor captures a first image directed externally of the vehicle with a first field of view. An internal image sensor captures a second image directed internally of the vehicle with a second field of view. An image integrator merges the first and second images according to a predetermined alignment of the first and second fields of view, wherein the second image is muted in the merged image so that the first image is emphasized when displayed on the image display.

19 Claims, 5 Drawing Sheets

(56) References Cited

U.S. PATENT DOCUMENTS

| | | | | |
|---|---|---|---|---|
| 2011/0115615 A1* | 5/2011 | Luo | ............................ | B60R 1/00 340/436 |
| 2012/0036097 A1* | 2/2012 | Prokhorov | ......... | G06K 9/00845 706/20 |
| 2013/0147910 A1* | 6/2013 | Xin | ..................... | H04N 5/23238 348/38 |

* cited by examiner

REAR VIEW CAMERA SYSTEM USING REAR VIEW MIRROR LOCATION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to driver vision systems, and, more specifically, to a rear view camera system using an external camera with a large field of view together with an internal camera and display providing contextual information to the driver.

Conventional vision aids enabling a driver to monitor the surroundings behind and to the side of a vehicle include externally-mounted side view mirrors and an internally-mounted rear view mirror. Mirror placement and shapes have been manipulated in attempts to minimize blind spots. Due to the many tradeoffs between mirror field of view, mounting locations, and interference by other solid vehicle structures, blind spots may still occur. For example, a trend toward increased head rest size has resulted in increased blocking of the rearward view from the center-located rear view mirror. The view through the rear view mirror may also be obscured by temporary objects in the interior such as rear seat passengers and cargo or by glare from headlamps of other vehicles. In addition, vehicle size and/or styling considerations may result in the use of relatively small back windows through which the rear view mirror obtains the exterior view. Regardless of window size, the buildup of dirt, frost, or snow which may sometimes occur on the back window may obscure the view obtained with the rear view mirror.

Backup cameras with a live video display presented on the instrument panel or dashboard have been introduced to alleviate some of these problems. Typically, the image from a backup camera is horizontally flipped for display on the video screen in order to give the driver a mirror image (i.e., since the driver is looking in the opposite direction from the camera, the image is flipped so that left and right in the displayed image correspond with the driver's left and right). The reverse-view display screen is activated while in reverse gear to help the driver check for any objects in their backup path, but it is typically deactivated during forward driving since the video can be distracting or may be confusing to the driver because of possible difficulties in integrating the reverse camera view into their mental frame of reference of the surroundings.

SUMMARY OF THE INVENTION

The present invention configures a rearview camera system to present an image to the driver using a display mounting location and/or visual cues to improve their frame of reference for interpreting the displayed image.

In one aspect of the invention, a rearward viewing system for an automotive vehicle comprises an image display mounted proximate to a front windshield of the vehicle. An exterior image sensor captures a first image directed externally of the vehicle with a first field of view. An internal image sensor captures a second image directed internally of the vehicle with a second field of view. An image integrator merges the first and second images according to a predetermined alignment of the first and second fields of view, wherein the second image is muted in the merged image so that the first image is emphasized when displayed on the image display.

DETAILED DESCRIPTION OF PREFERRED EMBODIMENTS

Figure 1:
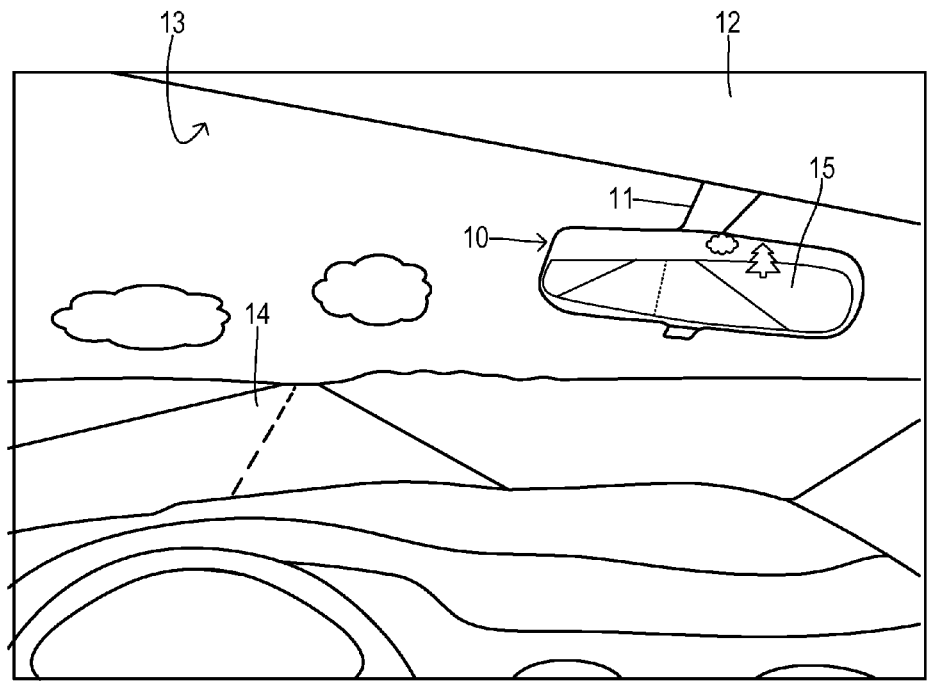
FIG. 1 depicts a driver's view toward a front windshield and rearview mirror.

In a primary embodiment of the present invention, the conventional (relatively narrow-angle) rearview mirror is replaced by an LCD screen showing a 180° or greater rear view from rearward and/or side facing camera(s). A sufficiently wide view can be obtained which could allow door-mounted side view mirrors to be eliminated. For example, a flat panel screen is pivotably mounted with a similar size, shape, and position as a traditional rear view mirror and provides a live camera image behind and/or to the side of the vehicle. This provides a view without obstructions from rear passengers, headrests, or roof pillars. In cold climates, the camera lens will be much quicker to clean/de-ice than the entire rear window. Furthermore, the invention reduces styling restrictions related to rear vision/obscuration that would otherwise exist for a mirror system.

In addition to the unobstructed view from the exterior-mounted rear cameras, the invention provides the driver with a vehicle reference by also displaying the rear head restraints, D or C roof pillars, and/or passengers present in an interior camera view. In an embodiment, augmented reality is used to provide a translucent overlay or shadow of the head restraints, pillars, and passengers from the rear facing interior camera onto the external camera view in order to generate a "see through" effect.

The exterior and internal image sensors can comprise normal daylight cameras, night vision cameras, blind spot detection sensors, cross traffic alert sensors, or combinations of these. One or more cameras can optionally provide an adjustable focal length (either optically or through digital processing of the images) under driver or automatic control. When multiple exterior cameras are used to provide a wider visual field, the separate images are post-processed to allow side and rear views to be seamlessly stitched together. For trailer towing situations, a supplemental camera system could be mounted to the rear of the trailer to allow unobstructed rear viewing.

The image display device may preferably be comprised of one or more LCD screens, LED panels, or similar pixilated device(s) mounted in place of the rear view mirror or at other appropriate viewing positions. Alternatively, a heads-up display HUD can be used for projecting the image onto the windshield or onto a reflector mounted in a similar position to the rear view mirror.

The internal image sensor or camera is preferably mounted on or near the rearview display in the passenger cabin to generate a view of rear seat occupants, rear headrests, or roof pillars to be include as a reference frame. The internal image is overlaid on the rear view image in a manner making it translucent. Thus, the driver is presented with an augmented reality in which a view similar to a traditional rearview mirror is displayed in which the driver can see through the otherwise obstructing interior objects to see all of the external view while still perceiving the internal objects to aid in judging distances and joining them in one frame of reference.

Figure 2:
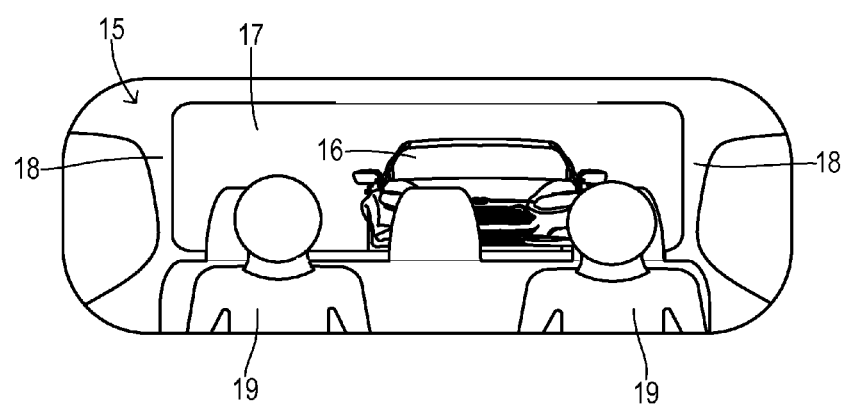
FIG. 2 depicts an image seen in a rearview mirror by a driver.

Referring now to FIG. 1, a conventional rear view mirror 10 is shown mounted by an arm 11 to an interior headliner 12 at a top, center region of a windshield 13. A driver sees a forward view of a road 14 directly through windshield 13 and has a view 15 in mirror 10 of objects behind the vehicle. FIG. 2 shows a typical image 15 seen in the rear view mirror including a trailing vehicle 16 seen through a back window 17. Roof pillars 18 and rear seat passengers 19 are also visible, and they obscure portions of the rearward view of the driver.

Figure 3:
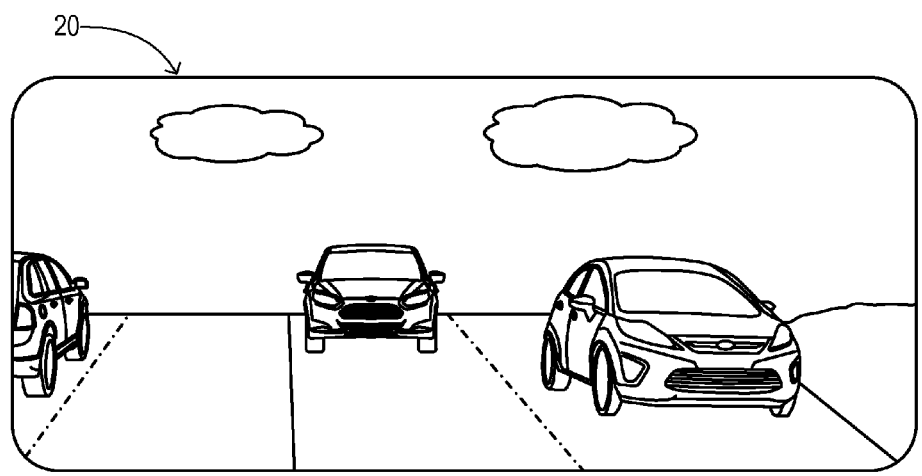
FIG. 3 is a live camera image captured by a rear-facing external camera.

FIG. 3 shows a rear camera image 20 from a camera externally-mounted on the vehicle which provides a clear and unobstructed live picture of the scene behind the vehicle. Image 20 has been horizontally flipped to correspond to a mirror view that would be seen by the driver. A wide visual field can be obtained using multiple image sensors and/or wide angle lenses. All or just part of the sensed exterior images may be reproduced on the display (e.g., as selected by the driver).

Figure 4:
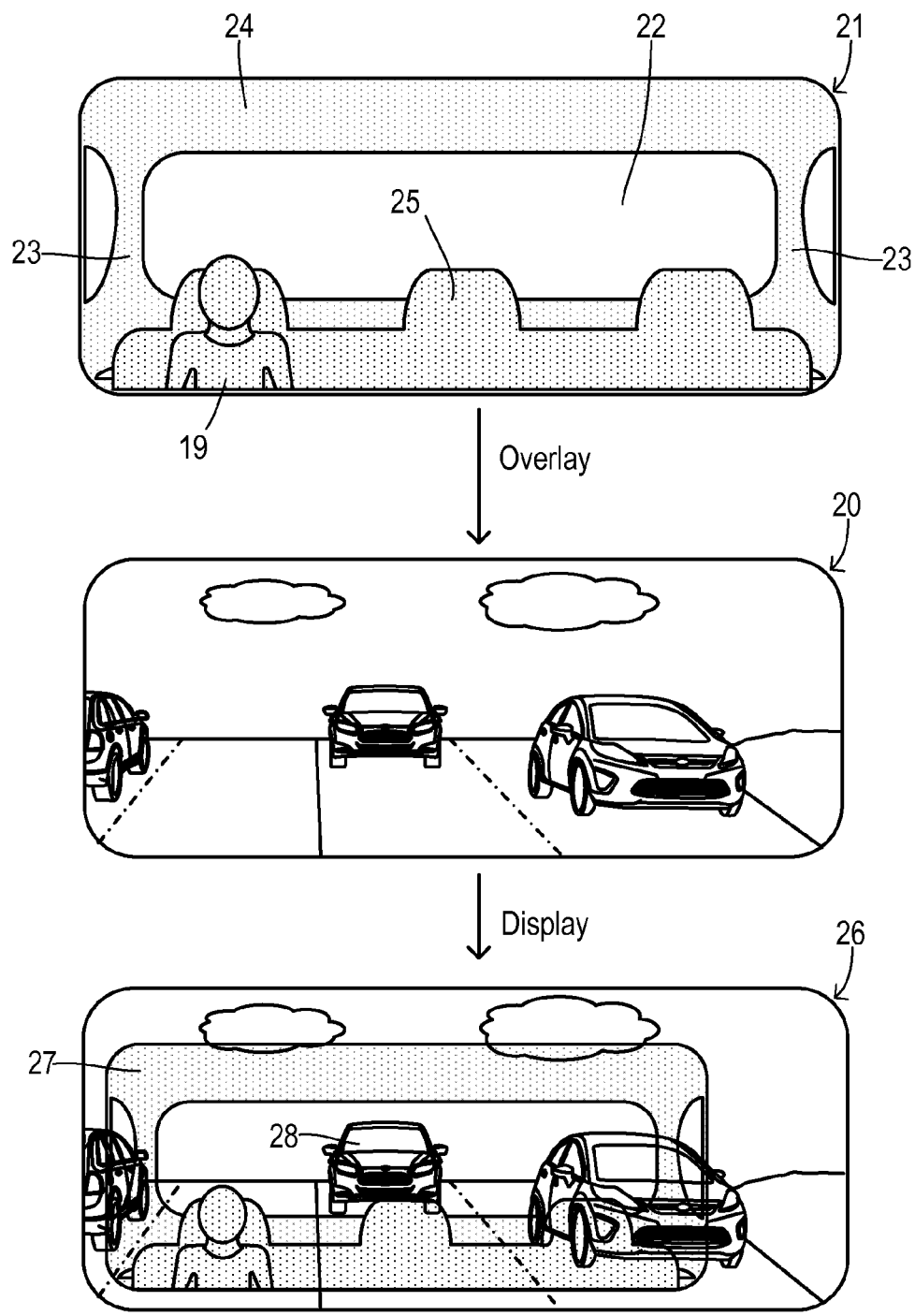
FIG. 4 shows the merging of internal and external camera images.

As explained above, reproduction of the image shown in FIG. 3 lacks the same automatic frame of reference as is inherently provided to the driver when using a rear view mirror. The invention provides such a frame of reference by using combined images as shown in FIG. 4, wherein in addition to external image 20 obtained from one or more exterior image sensors, an internal vehicle image 21 is simultaneously obtained by an internal image sensor, preferably mounted at or near the traditional rear view mirror location. Visible objects in internal image 21 include a back window 22, roof pillars 23, a roof panel 24, passenger 19, and a rear seat and headrests 25. Other internal objects such as rear seat passengers or headrests (not shown) and exterior objects such as the trunklid of the vehicle, the roadway, or nearby vehicles (not shown) may also be sensed by the internal image sensor. As described below, some sensed objects can be removed from the internal vehicle image by cropping if desired. Internal image 21 is horizontally flipped in preparation for merging with horizontally-flipped rear external camera views.

Prior to being overlaid with external image 20, internal image 21 is further modified by muting it in a manner that emphasizes the external image in the merged image displayed on the display device. In particular, each image 20 and 21 includes respective pixels. In the merge process, at least some pixels of internal image 21 are mapped to and aggregated with respective pixels of external image 20. Muting may be comprised of reducing the intensity of each of the pixels within the internal image prior to adding each pixel to the corresponding pixels in the external image. In another embodiment, the color saturation of each pixel of the internal image is reduced in order to mute the contribution of the internal image into the final merged image 26.

The degree of muting or "ghosting" of the internal image may be fixed by design or may be configurable. In one embodiment, it can be manually adjustable by the driver through an HMI such as push buttons, touch screen, or voice activation. Thus, the driver could make a passenger more or less visible according to an ongoing conversation or the need to monitor a child, for example. Alternatively, the degree of muting could be varied automatically, such as 1) making the internal image or a portion thereof more visible in response to detection (e.g., via a microphone) that a rear seat passenger is speaking, or 2) further suppressing the internal image when presenting a visible alert or enhancement of the external image related to an exterior object such as another vehicle on a collision course.

Besides the muting of the internal image, the process for overlaying the internal image on the external image includes a registration process wherein the fields of view for the exterior and internal image sensors are matched up according to a predetermined alignment in order to match the fields of view. Thus, an overlay 27 appearing on merged image 26 has a correct placement on external image 20 so that an object such as a car 28 within the external image is shown relative to back window opening 22 in the same spot where it would appear in a traditional rear view mirror. To the extent that internal image 21 includes an object seen behind the vehicle, the muted representation of the object would also be placed in the merged image to coincide with the view of the object in the external image. By seeing the relative position of objects in the external camera view with respect to the line of sight identified by the inclusion of the internal image objects, the driver has an improved feel for the relative position of the host vehicle with all the objects seen in the merged image.

Figure 5:
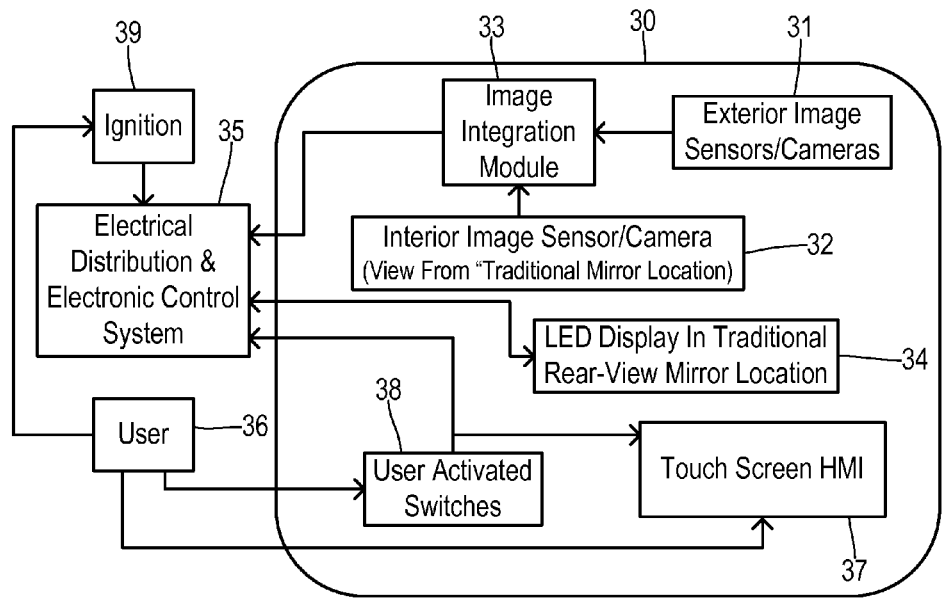
FIG. 5 is a block diagram showing one preferred apparatus of the invention.

FIG. 5 shows a preferred embodiment of an apparatus of the present invention. A rearward viewing system 30 includes one or more exterior image sensors or cameras 31 and an interior image sensor or camera 32, each of which is coupled to an image integration module 33. Module 33 may preferably include a microcontroller configured to execute an augmented reality application of the type which can be developed using publicly available tools such as ARToolKit and ATOMIC Authoring Tool which are open-source, and VYZAR which is available from Limitless Computing, Inc. Module 33 is coupled to an image display device 34 via the vehicle's electrical distribution and electronic control system 35. Display device 34 may be comprised of an LED display in a traditional rear view mirror location, for example. Other types of display such as LCD or projection displays, and/or other locations such as on an instrument panel, at other positions within the area of a front windshield, or at a side view mirror location can be employed. Image integration module 33 and/or electronic control system 35 may interface with a user or driver 36 via a touch screen HMI 37 and/or user activated switches 38 in order to select and/or adjust various parameters or features of the rearward viewing system. A vehicle ignition switch 39 may also be monitored in order to enable or disable certain adjustments or functions according to whether the vehicle is running.

Among the functions performed by image integration module 30 are calculations and image manipulations including horizontal flipping, image registration to match fields of view, manipulating pixel values for muting an internal image, object detection for removal or highlighting, and stitching together of separate camera images with different fields of view into an aggregated visual field.

In the image cropping as mentioned above, image integrator module 33 identifies selected objects in the internal image and all portions of the internal image not containing the identified objects are made transparent. The selected objects may preferably include internal vehicle structures such as roof pillars and headrests as well as rear seat passengers which remain visible so that the driver can maintain eye contact with a passenger.

Figure 6:
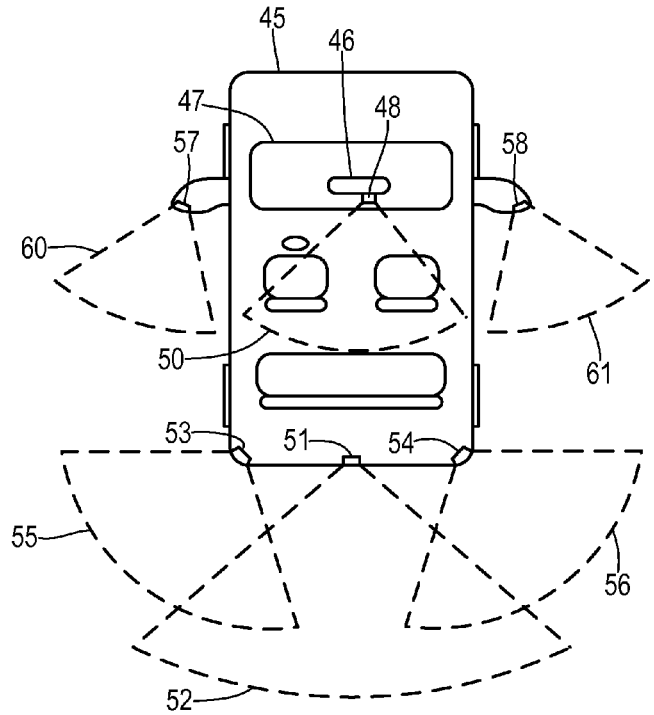
FIG. 6 illustrates several potential camera positions on a vehicle for use in the invention.

Various camera layouts in a vehicle 45 are shown in FIG. 6. An image display device 46 is mounted at a top, center position of a windshield 47 corresponding to a traditional rear view mirror placement. An internal image sensor 48 may be physically integrated with device 46 or may be located at or nearby in order to capture an internal vehicle image according to an internal field of view 50. The closer the location sensor 48 to the traditional rear view mirror location, then the better the frame of reference that will be imparted to the driver, although other locations such as an overhead console or the rear-facing side of a front-seat head rest can also be used.

Figure 7:
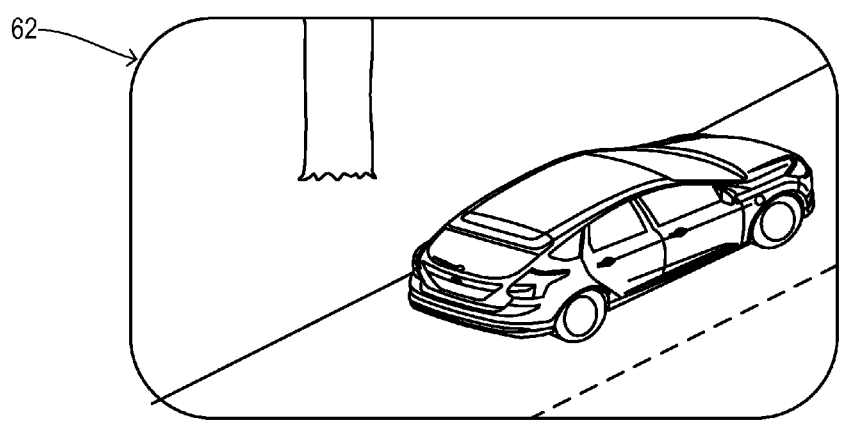
FIG. 7 is a live camera image captured by a side-facing external camera.

A first exterior image sensor 51 is provided at a center rear position on vehicle 45 to capture an external field of view 52. To provide greater coverage of an aggregate visual field, additional exterior image sensors 53 and 54 may be provided at the rear corners of vehicle 46 thereby capturing separate exterior images according to fields of view 55 and 56. A sideways exterior view can be further increased using side view mirror or door mounted exterior sensors 57 and 58 with corresponding fields of view 60 and 61. FIG. 7 shows a more sideways-directed field of view from a side mounted exterior image sensor to produce an exterior image 62. Exterior image 62 can then be stitched together with other exterior views from other image sensors by the image integration module, for example.

Figure 8:
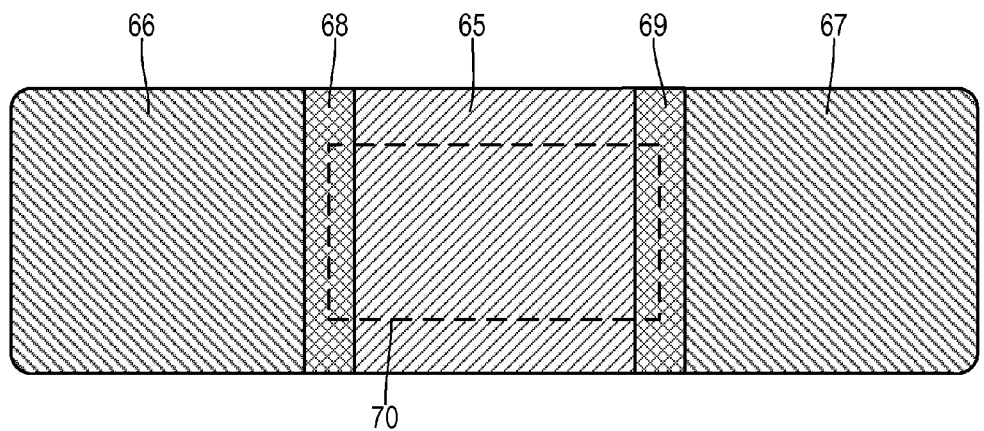
FIG. 8 shows an aggregated visual field for an internal camera and a plurality of external cameras.

FIG. 8 shows one embodiment wherein a centered, external field of view 65 corresponds to a center-mounted exterior camera and wherein regions 66 and 67 correspond to left and right fields of view from rear corner mounted exterior sensors. The sensors may be positioned so that there are overlaps between the fields of view at regions 68 and 69. A dashed box 70 shows where the field of view for an internal mounted image sensor coincides with fields of view 65-67, based on a particular placement of the internal image sensor. In the event that the internal image sensor is mounted to an articulating display (similar to an adjustable rear view mirror) so that its viewing direction changes, various means can be provided to determine the corresponding placement of interior field of view 70 with respect to the fields of view of the external sensors 65-67.

Figure 9:
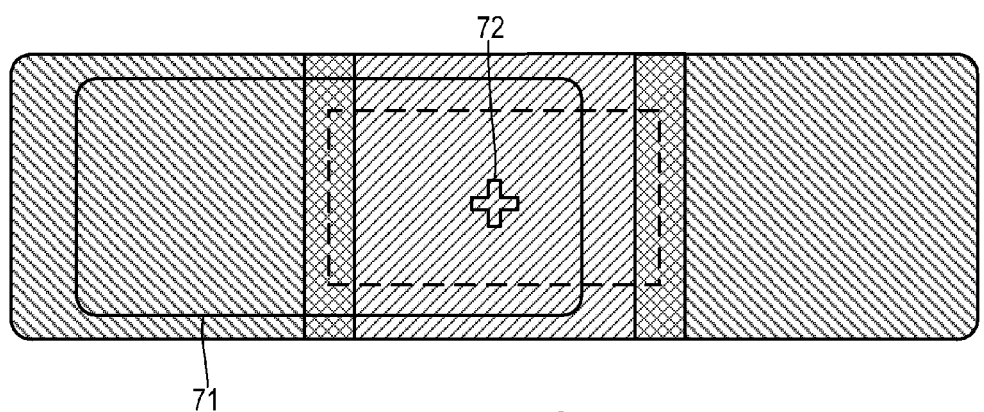
FIG. 9 shows a selected field of view within the aggregated visual field to be displayed to the driver.

In a simplest embodiment, all image sensors may be fixed and the image from each always mapped to the same position on the display device. In other embodiments, the contents of the display may be panned or zoomed to track areas of interest. Thus, a visible region 71 within the available aggregated visual field of all the image sensors may be identified for reproduction on the image display device as shown in FIG. 9. The selected portion 71 may be determined by the driver using the HMI shown in FIG. 5, or may be automatically determined by a controller in the rearward viewing system or another vehicle electronic control system according to the current driving situation. The selected views and corresponding driving states may include 1) a center view when backing up, 2) a view slewed to the left or right when detecting a lane change, and 3) a variable width (i.e., zoomed in) view for which the angular field of view becomes narrower with increasing forward speeds.

In the registration process, the fields of view of the exterior image sensor and internal image sensor may be fixed. In that event, registration or the predetermined alignment of images may be comprised of a fixed mapping stored within image integration module 33. In the event there is a selectable or steerable field of view of a desired visual image from the exterior image sensors, then the field of view for the internal image sensor is appropriately mapped onto the desired visible region for merging the internal and exterior images.

Image integration module 33 may also be configured to overlay a positional reference marker onto the merged image. Thus, a reference marker 72 is mapped to a position on the merged image as shown in FIG. 9 in order to correspond to a fixed distance behind a center of a vehicle. This gives a more precise frame of reference to the driver.

The rearward viewing system as described above can be integrated with other vehicle systems for additional benefits. For example, a collision alert system can be implemented which detects other vehicles that are on a collision path with the host vehicle by monitoring nearby vehicles' speeds and trajectories. A vehicle that may potentially collide would be highlighted in the merged image. The driver may also be alerted with an audible warning.

Another feature that can be implemented with the rearward viewing system is a lane change "go/no go" system. When the driver starts to perform a lane change, images from the exterior cameras are inspected by the image processor to determine whether the target road space is clear of vehicles (including the trajectory of vehicles approaching the road space). If driver inputs (steering wheel angle, yaw rate, vehicle speed, etc.) are calculated to take the vehicle into a road space that is not projected to be clear then varying degrees of driver feedback would be initiated, such as highlighting on the display any vehicle potentially interfering with the lane change (such as adding an outline, a warning arrow, or a flashing image).

The invention may preferably include a glare-reduction function. During night time driving rather than dimming the entire image, any headlight glare could be detected and then "dimmed" locally while the remainder of the image is allowed to remain as visible as possible. Other image processing functions based on localized artifacts can also be used such as correcting distortion caused by raindrops.

Night driving can also include a night vision function. Night vision (e.g., infrared) cameras can be used to provide a better picture than the daytime cameras, or be used in combination to enhance the image. Thus, the external image may itself be a composite image using overlapping images from multiple sensors such as a daylight camera, thermal camera, and/or infrared camera in order to increase visibility of the external scene.

The invention can include a fast clear feature to remove moisture, snow, and ice from the exterior camera lens. With a smaller surface to clean or defrost, the rear view can be recovered very quickly. Mechanisms for clearing the lens include washers, miniature wipers, and heating elements. Furthermore, the camera(s) can be mounted at locations where the vehicle's aerodynamics naturally keep the lens cleaner.

Although the present invention has been described as a replacement for a driver's rearview mirror, it can also be used in connection with external viewing systems for other vehicle occupants such as a rear seat passenger. The external view for a rear seat passenger could be from either forward-facing cameras or rearward-facing cameras (and the internal image would preferably be pointed in the same direction).

What is claimed is:

1. A rearward viewing system for an automotive vehicle, comprising:
    an image display mounted for viewing by a driver;
    an exterior image sensor for capturing a first image directed externally of the vehicle with a first field of view;
    an internal image sensor for capturing a second image directed internally of the vehicle with a second field of view, wherein the first and second fields of view at least partially overlap; and
    an image integrator merging the first and second images according to a predetermined alignment to join the first and second fields of view into a same reference frame, wherein the second image is muted in the merged image to see through the second image to the first image, so that the first image is emphasized when displayed on the image display.

2. The system of claim 1 wherein the image display is located at a top, center position of the windshield corresponding to a traditional rearview mirror placement.

3. The system of claim 2 wherein the internal image sensor is integrated with the image display.

4. The system of claim 1 wherein the image display is comprised of an LCD screen.

5. The system of claim 1 wherein the image integrator is comprised of an augmented reality application.

6. The system of claim 1 wherein the first and second images are comprised of respective pixels, and wherein muting of the second image is comprised of reducing an intensity of the contribution of pixels of the second image onto the merged image.

7. The system of claim 1 wherein the first and second images are comprised of respective pixels, and wherein muting of the second image is comprised of reducing a saturation of the pixels of the second image.

8. The system of claim 1 wherein a degree of muting of the second image is adjustable.

9. The system of claim 1 wherein muting of the second image is comprised of making portions of the second image transparent.

10. The system of claim 9 wherein the image integrator identifies selected objects in the second image, and wherein the transparent portions are comprised of all of the second image not containing the identified objects.

11. The system of claim 1 wherein the first and second fields of view are fixed.

12. The system of claim 1 wherein the first field of view is steerable with respect to the vehicle, wherein the first field of view defines a visible region to be shown on the image display, and wherein the second field of view is mapped onto the first field of view for merging the second image with the first image.

13. The system of claim 12 further comprising:
    a plurality of external image sensors providing an aggregated visual field; and
    a user HMI for selecting the first field of view within the aggregated visual field.

14. The system of claim 12 further comprising:
    a plurality of external image sensors providing an aggregated visual field; and
    an automatic view selector for determining the first field of view within the aggregated visual field in response to a driving state of the vehicle.

15. The system of claim 1 wherein the image integrator modifies one of the first or second images or the merged image to encode information about an object detected within one of the images.

16. The system of claim 1 wherein the image integrator overlays a positional reference marker within the merged image.

17. A method of displaying rear view information to a driver of a vehicle, comprising:
    capturing, with an interior image sensor, a second image directed behind the driver;
    capturing, with an exterior image sensor, a first image directed behind the vehicle;
    merging the images according to a joined reference frame with the second image muted to see-through to the first image; and
    displaying the merged image on a display mounted at a rearview mirror location.

18. The method of claim 17 further comprising the step of:
    muting the internal image within the merged image so that the external image is emphasized in the merged image.

19. The method of claim 18 wherein the internal and external images are comprised of respective pixels, and wherein muting of the internal image is comprised of reducing an intensity of the contribution of pixels of the internal image into the merged image.

* * * * *